(12) United States Patent
Xia et al.

(10) Patent No.: US 11,704,026 B2
(45) Date of Patent: Jul. 18, 2023

(54) DATA RECONSTRUCTION METHOD, APPARATUS, ELECTRONIC DEVICE, AND STORAGE MEDIUM (71) Applicant: HANGZHOU HIKVISION SYSTEM TECHNOLOGY CO., LTD., Hangzhou (CN)

(72) Inventors: Weiqiang Xia, Hangzhou (CN); Weichun Wang, Hangzhou (CN); Qiqian Lin, Hangzhou (CN); Wei Wang, Hangzhou (CN)

(73) Assignee: HANGZHOU HIKVISION SYSTEM TECHNOLOGY CO., LTD., Hangzhou (CN)

( * ) Notice: Subject to any disclaimer, the term of this patent is extended or adjusted under 35 U.S.C. 154(b) by 30 days.

(21) Appl. No.: 17/256,852

(22) PCT Filed: Jun. 19, 2019

(86) PCT No.: PCT/CN2019/091858
§ 371 (c)(1),
(2) Date: Dec. 29, 2020

(87) PCT Pub. No.: WO2020/001340
PCT Pub. Date: Jan. 2, 2020

(65) Prior Publication Data
US 2021/0318809 A1 Oct. 14, 2021

(30) Foreign Application Priority Data
Jun. 29, 2018 (CN) .......................... 201810694042.8

(51) Int. Cl.
G06F 3/06 (2006.01)

(52) U.S. Cl.
CPC ............ G06F 3/0619 (2013.01); G06F 3/067 (2013.01); G06F 3/0634 (2013.01); G06F 3/0689 (2013.01)

(58) Field of Classification Search
CPC ...... G06F 3/0619; G06F 3/0634; G06F 3/067; G06F 3/0689
See application file for complete search history.

(56) References Cited

U.S. PATENT DOCUMENTS 10,642,690 B1 * 5/2020 Tian ........................ G06F 3/061
2009/0088877 A1 * 4/2009 Terauchi ................ G10H 1/368
700/94

(Continued)

FOREIGN PATENT DOCUMENTS

CN 104536698 4/2015
CN 104598171 5/2015

(Continued)

OTHER PUBLICATIONS

International Search Report and Written Opinion issued in Corresponding PCT Application No. PCT/CN2019/091858, dated Sep. 25, 2019 (English translation provided).
Extended European Search Report issued in Corresponding European Application No. 19826622.3, dated Jul. 26, 2021.

Primary Examiner — Arpan P. Savia
Assistant Examiner — Eric T Loonan
(74) Attorney, Agent, or Firm — Norton Rose Fulbright US LLP (57) ABSTRACT Disclosed is a data reconstruction method and apparatus, and an electronic device, and a storage medium. The method comprises: obtaining attribute information for a plurality of to-be-reconstructed data items; wherein the attribute information of any of the to-be-reconstructed data items is information recorded before the to-be-reconstructed data item is lost; determining, according to the attribute infor-
(Continued)

mation for the plurality of to-be-reconstructed data items, a reconstruction order for the plurality of to-be-reconstructed data items in a preset target sorting manner; wherein, the target sorting manner relates to the attribute information, and in the target sorting manner, a data item of greater importance has a higher priority in reconstruction. Recovery rate of important data is increased.

5 Claims, 3 Drawing Sheets

(56) References Cited

U.S. PATENT DOCUMENTS

| | | | |
|---|---|---|---|
| 2009/0189996 A1* | 7/2009 | Shimazaki | H04N 21/4385 348/222.1 |
| 2014/0365819 A1 | 12/2014 | Cooper et al. | |
| 2016/0179644 A1* | 6/2016 | Wu | G06F 11/1092 714/6.22 |
| 2016/0239384 A1 | 8/2016 | Slik et al. | |
| 2017/0091052 A1* | 3/2017 | Gao | G06F 11/1092 |
| 2017/0242627 A1 | 8/2017 | Mills et al. | |

FOREIGN PATENT DOCUMENTS

| | | |
|---|---|---|
| CN | 106557266 | 4/2017 |
| CN | 108093207 | 5/2018 |

* cited by examiner

DATA RECONSTRUCTION METHOD, APPARATUS, ELECTRONIC DEVICE, AND STORAGE MEDIUM

CROSS-REFERENCE TO RELATED APPLICATIONS

The present application is a national phase application under 35 U.S.C. § 371 of International Application No. PCT/CN2019/091858, filed Jun. 19, 2019, which claims priority to Chinese patent application No. 201810694042.8, filed with the China National Intellectual Property Administration on Jun. 29, 2018. The contents of which applications are incorporated herein by reference in their entirety.

TECHNICAL FIELD

The application relates to the field of cloud storage, and in particular to a data reconstruction method and apparatus, an electronic device and a storage medium.

BACKGROUND

In cloud storage, in order to avoid the loss of data stored by nodes in a storage cluster, Redundant Arrays of Independent Disks (RAID) technology can be used to protect the stored data across nodes, that is, when a certain node in the storage cluster is abnormal, other nodes are used for data reconstruction. Currently, in relevant art, RAID are typically implemented based on EC (erasure code) technology.

Specifically, in existing data reconstruction technologies, data is reconstructed in a sequence in which the data is written. The data reconstruction is a process where lost data is recalculated and restored through the data of other nodes.

However, the inventor found that in the above-mentioned related technology, in case that data is reconstructed in a writing sequence thereof, important but later written data may not be able to be recovered once a new failure occurs in the storage cluster during the data reconstruction process. This may affect the recovery rate of these important data.

SUMMARY

Embodiments provide a data reconstruction method and apparatus, an electronic device and a storage medium. The recovery rate of important data can be improved. The specific technical solutions are as follows.

In a first aspect, the embodiment of the present application provides a data reconstruction method, including:

obtaining attribute information for a plurality of to-be-reconstructed data items; wherein the attribute information of any of the to-be-reconstructed data items is information recorded before the to-be-reconstructed data item is lost; and determining, according to the attribute information for the plurality of to-be-reconstructed data items, a reconstruction order for the plurality of to-be-reconstructed data items in a preset target sorting manner;

wherein, the target sorting manner relates to the attribute information, and in the target sorting manner, a data item of greater importance has a higher priority in reconstruction.

Optionally, the plurality of to-be-reconstructed data items include a plurality of to-be-reconstructed video data items; the attribute information includes a data type;

wherein, the data type includes: a non-alarm type, an alarm type and an intelligent type.

Optionally, in the target sorting manner, the intelligent type precedes the alarm type, and the alarm type precedes the non-alarm type;

the operation of determining, according to the attribute information for the plurality of to-be-reconstructed data items, a reconstruction order for the plurality of to-be-reconstructed data items in a preset target sorting manner includes:

determining respectively, from the plurality of to-be-reconstructed video data items, a first type of to-be-reconstructed video data items corresponding to the intelligent type, a second type of to-be-reconstructed video data items corresponding to the alarm type, and a third type of to-be-reconstructed video data items corresponding to the non-alarm type; and determining the reconstruction order for the plurality of to-be-reconstructed data items as: the first type of to-be-reconstructed video data items, the second type of to-be-reconstructed video data items, and the third type of to-be-reconstructed video data items.

Optionally, the attribute information further includes a storage moment;

in the target sorting manner, data items of the same type are sorted in terms of storage moments;

the operation of determining the reconstruction order for the plurality of to-be-reconstructed data items as: the first type of to-be-reconstructed video data items, the second type of to-be-reconstructed video data items, and the third type of to-be-reconstructed video data items includes:

sorting respectively the first type of to-be-reconstructed video data items, the second type of to-be-reconstructed video data items, and the third type of to-be-reconstructed video data items according to storage moments of to-be-reconstructed video data items; and determining the reconstruction order for the plurality of to-be-reconstructed data items as: the first type of to-be-reconstructed video data items as sorted, the second type of to-be-reconstructed video data items as sorted, and the third type of to-be-reconstructed video data items as sorted.

Optionally, the attribute information further includes a playback frequency and a set state;

wherein, the set state includes a lock state and an unlock state.

Optionally, in the target sorting manner, a first batch of data items are to-be-reconstructed video data items having a playback frequency meeting a preset condition, a second batch of data items are to-be-reconstructed video data items in the lock state, a third batch of data items are to-be-reconstructed video data items of the intelligent type, a forth batch of data items are to-be-reconstructed video data items of the alarm type, and a fifth batch of data items are to-be-reconstructed video data items other than the first batch of to-be-reconstructed video data items, the second batch of to-be-reconstructed video data items, the third batch of to-be-reconstructed video data items and the fourth batch of to-be-reconstructed video data items;

the operation of determining, according to the attribute information for the plurality of to-be-reconstructed data items and a preset target sorting manner, a reconstruction order for the plurality of to-be-reconstructed data items in a preset target sorting manner includes:

determining a first type of to-be-reconstructed video data items having a playback frequency meeting the preset condition from the plurality of to-be-reconstructed video data;

determining a second type of to-be-reconstructed video data items that are in the lock state from to-be-reconstructed video data items other than the first type of to-be-reconstructed video data items;

determining a third type of to-be-reconstructed video data items corresponding to the intelligent type from to-be-reconstructed video data items other than the first type of to-be-reconstructed video data items and the second type of to-be-reconstructed video data items;

determining a forth type of to-be-reconstructed video data items corresponding to the alarm type from to-be-reconstructed video data items other than the first type of to-be-reconstructed video data items, the second type of to-be-reconstructed video data items and the third type of to-be-reconstructed video data items;

determining to-be-reconstructed video data items other than the first type of to-be-reconstructed video data items, the second type of to-be-reconstructed video data items, the third type of to-be-reconstructed video data items and the forth type of to-be-reconstructed video data items as a fifth type of to-be-reconstructed video data items; and determining the reconstruction order for the plurality of to-be-reconstructed data items as: the first type of to-be-reconstructed video data items, the second type of to-be-reconstructed video data items, the third type of to-be-reconstructed video data items, the forth type of to-be-reconstructed video data items and the fifth type of the to-be-reconstructed video data items.

Optionally, the attribute information includes a data type.

in the target sorting manner, data items of the same batch are sorted in terms of storage moments;

the operation of determining the reconstruction order for the plurality of to-be-reconstructed data items as: the first type of to-be-reconstructed video data items, the second type of to-be-reconstructed video data items, the third type of to-be-reconstructed video data items, the forth type of to-be-reconstructed video data items and the fifth type of the to-be-reconstructed video data items includes:

sorting respectively the first type of to-be-reconstructed video data items, the second type of to-be-reconstructed video data items, the third type of to-be-reconstructed video data items, the forth type of to-be-reconstructed video data items and the fifth type of to-be-reconstructed video data items according to storage moments of to-be-reconstructed video data items; and determining the reconstruction order for the plurality of to-be-reconstructed data items as: the first type of to-be-reconstructed video data items as sorted, the second type of to-be-reconstructed video data items as sorted, the third type of to-be-reconstructed video data items as sorted, the forth type of to-be-reconstructed video data items as sorted and the fifth type of to-be-reconstructed video data items as sorted.

In a second aspect, the embodiment of the present application provides a data reconstruction apparatus, including:

an obtaining module configured for obtaining attribute information for a plurality of to-be-reconstructed data items; wherein the attribute information of any of the to-be-reconstructed data items is information recorded before the to-be-reconstructed data item is lost; and a determining module configured for determining, according to the attribute information for the plurality of to-be-reconstructed data items, a reconstruction order for the plurality of to-be-reconstructed data items in a preset target sorting manner; wherein, the target sorting manner relates to the attribute information, and in the target sorting manner, a data item of greater importance has a higher priority in reconstruction.

Optionally, the plurality of to-be-reconstructed data items includes a plurality of to-be-reconstructed video data items;

the attribute information includes a data type;

wherein, the data type includes: a non-alarm type, an alarm type and an intelligent type.

Optionally, in the target sorting manner, the intelligent type precedes the alarm type, and the alarm type precedes the non-alarm type;

the determining module includes:

a first submodule configured for determining respectively, from the plurality of to-be-reconstructed video data items, a first type of to-be-reconstructed video data items corresponding to the intelligent type, a second type of to-be-reconstructed video data items corresponding to the alarm type, and a third type of to-be-reconstructed video data items corresponding to the non-alarm type; and a second submodule configured for determining the reconstruction order for the plurality of to-be-reconstructed data items as: the first type of to-be-reconstructed video data items, the second type of to-be-reconstructed video data items, and the third type of to-be-reconstructed video data items.

Optionally, the attribute information further includes a storage moment;

in the target sorting manner, data items of the same type are sorted in terms of storage moments;

the second submodule is further configured for:

sorting respectively the first type of to-be-reconstructed video data items, the second type of to-be-reconstructed video data items, and the third type of to-be-reconstructed video data items according to storage moments of to-be-reconstructed video data items; and determining the reconstruction order for the plurality of to-be-reconstructed data items as: the first type of to-be-reconstructed video data items as sorted, the second type of to-be-reconstructed video data items as sorted, and the third type of to-be-reconstructed video data items as sorted.

Optionally, the attribute information further includes a playback frequency and a set state;

wherein, the set state includes a lock state and an unlock state.

Optionally, in the target sorting manner, a first batch of data items are to-be-reconstructed video data items having a playback frequency meeting a preset condition, a second batch of data items are to-be-reconstructed video data items in the lock state, a third batch of data items are to-be-reconstructed video data items of the intelligent type, a forth batch of data items are to-be-reconstructed video data items of the alarm type, and a fifth batch of data items are to-be-reconstructed video data items other than the first batch of to-be-reconstructed video data items, the second batch of to-be-reconstructed video data items, the third batch of to-be-reconstructed video data items and the fourth batch of to-be-reconstructed video data items;

the determining module includes:

a first submodule configured for:

determining a first type of to-be-reconstructed video data items having a playback frequency meeting the preset condition from the plurality of to-be-reconstructed video data;

determining a second type of to-be-reconstructed video data items that are in the lock state from to-be-reconstructed video data items other than the first type of to-be-reconstructed video data items;

determining a third type of to-be-reconstructed video data items corresponding to the intelligent type from to-be-reconstructed video data items other than the first type of to-be-reconstructed video data items and the second type of to-be-reconstructed video data items;

determining a forth type of to-be-reconstructed video data items corresponding to the alarm type from to-be-reconstructed video data items other than the first type of to-be-reconstructed video data items, the second type of to-be-reconstructed video data items and the third type of to-be-reconstructed video data items; and determining to-be-reconstructed video data items other than the first type of to-be-reconstructed video data items, the second type of to-be-reconstructed video data items, the third type of to-be-reconstructed video data items and the forth type of to-be-reconstructed video data items as a fifth type of to-be-reconstructed video data items; and a second submodule configured for determining the reconstruction order for the plurality of to-be-reconstructed data items as: the first type of to-be-reconstructed video data items, the second type of to-be-reconstructed video data items, the third type of to-be-reconstructed video data items, the forth type of to-be-reconstructed video data items and the fifth type of the to-be-reconstructed video data items.

Optionally, the attribute information further includes a storage moment;

in the target sorting manner, data items of the same batch are sorted in terms of storage moments;

the second submodule is further configured for:

sorting respectively the first type of to-be-reconstructed video data items, the second type of to-be-reconstructed video data items, the third type of to-be-reconstructed video data items, the forth type of to-be-reconstructed video data items and the fifth type of to-be-reconstructed video data items according to storage moments of to-be-reconstructed video data items; and determining the reconstruction order for the plurality of to-be-reconstructed data items as: the first type of to-be-reconstructed video data items as sorted, the second type of to-be-reconstructed video data items as sorted, the third type of to-be-reconstructed video data items as sorted, the forth type of to-be-reconstructed video data items as sorted and the fifth type of to-be-reconstructed video data items as sorted.

In a third aspect, the embodiment of the present application provides an electronic device, including a processor and a memory.

The memory is configured for storing a computer program.

The processor is configured for implementing the steps of data reconstruction method provided by the embodiment of the present application when executing the computer program stored in the memory.

In a fourth aspect, the present application provides a computer-readable storage medium, having stored thereon a computer program which, when executed by a processor, causes the processor to perform the operations of the data reconstruction method provided by the embodiment of the present application.

In the solution provided by the embodiment of the present application, when data items need to be reconstructed, based on the pre-recorded attribute information for the plurality of to-be-reconstructed data, a reconstruction order for the plurality of to-be-reconstructed data is determined in a preset target sorting manner. A principle for reconstruction is that, in the target sorting manner, a data item of greater importance has a higher priority in reconstruction. This may reduce the probability that the important data cannot be recovered in case another failure occurs to the storage cluster. Recovery rate of important data is increased.

Obviously, any product or method of the present application does not necessarily achieve all the advantages described above simultaneously.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

The present application is further described in detail below with reference to the appended drawings and embodiments, for the purpose of clarifying the objects, technical solutions and advantages of the present application. Obviously, the described embodiments are only some, and not all, of the embodiments of the present application. All other embodiments obtained based on the embodiments of the present application by those skilled in the art without any creative efforts fall into the scope of protection defined by the present application.

For ease of understanding, a brief introduction of various components of a cloud storage system is provided.

There is at least one management server and a plurality of storage servers in the cloud storage system. The management server has at least data management functions. In terms of functional modules, the management server includes at least a data management module Data Manage for data management. The storage server has at least data storage function and data reconstruction function. In terms of functional modules, the storage server at least includes an access service module Access Service, an encoding module Encode, and a data storage service module Storage Service. The specific role of each module in the management server and the storage server will be described later.

In order to improve the recovery rate of important data, the embodiment of the present application provides a data reconstruction method and apparatus, and an electronic device, and a storage medium.

It should be noted that the data reconstruction method provided in the embodiment of the present application may be performed on a management server in a cloud storage system, and more specifically, on the aforementioned Data Manager.

In the following, a data reconstruction method provided by an embodiment of the present application is first introduced.

Figure 1:
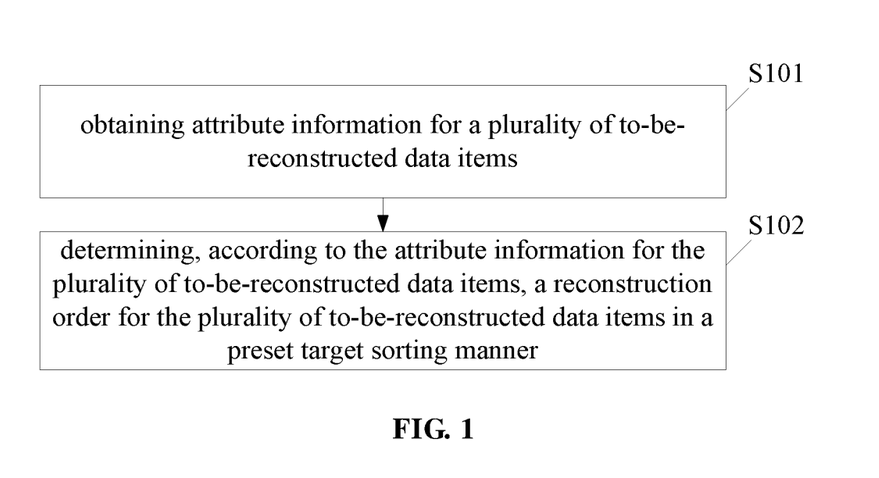
FIG. 1 is a schematic flowchart of a data reconstruction method provided by an embodiment of the application.

As shown in FIG. 1, a data reconstruction method provided by an embodiment of the application may include the following operations.

At S101, attribute information for a plurality of to-be-reconstructed data items is obtained.

In embodiments of the present application, the attribute information for any of the to-be-reconstructed data items is a piece of information recorded before the to-be-reconstructed data item is lost.

In order to improve the recovery rate of important data, before a data item in the cloud storage system is lost, the attribute information for the data item may be recorded, and later used as basis to assess the importance of the data item. The storage location of the attribute information may be a location in the database of the Data Manage. The recording and storing process of attribute information will be described in detail later.

When data needs to be reconstructed, the Data Manager can obtain attribute information for a plurality of to-be-reconstructed data items from the database.

The plurality of to-be-reconstructed data items may include: a plurality of to-be-reconstructed video data items. Of course, embodiments are not so limited. For example, the plurality of to-be-reconstructed data items may include a plurality of to-be-reconstructed text data items, or a plurality of to-be-reconstructed audio data items, etc.

It should be noted that attribute information for data reconstruction can be determined and pre-recorded as required. In a specific application, in a specific implementation, the attribute information that can be determined in the data storage process can be used as the attribute information for data reconstruction, such as data type, data source and storage moment. In another specific implementation, the attribute information that can be determined during the data access process can be used as the attribute information for data reconstruction, such as the access frequency or the access time, etc. In still another specific implementation, it is reasonable to use the attribute information that can be determined during the data access process and during the data storage process as the attribute information for data reconstruction.

Taking a to-be-reconstructed video data item as an example, one or more of data type, storage moment, playback frequency, and the set state can be used as the attribute information for data reconstruction. Of course, embodiments are not limited in this aspect.

It should be noted that the data type may include a non-alarm type, an alarm type and an intelligent type, and may depend on the camera that shoots the video. The determination process of data types will be described in detail later.

The set state may include a lock state and an unlock state, and the set state is a state set by the user according to his own needs when accessing video data. Specifically, the default set state of all video data items can be unlocked state. In this way, when a user accesses the video data and regards it as important video data that needs to be protected, in order to prevent others from deleting the video data, the user may change the set state of the video data to the lock state. Of course, the user may also change the set state of the video data that is no more important from the lock state to the unlock state.

At S102, a reconstruction order for the plurality of to-be-reconstructed data items in a preset target sorting manner is determined according to the attribute information for the plurality of to-be-reconstructed data items.

In the embodiment of the present application, the target sorting manner relates to the attribute information, and in the target sorting manner, a data item of greater importance has a higher priority in reconstruction.

The attribute information is used as a criterion for determining the importance of data. In this embodiment of the present application, a principle is that, a data item of greater importance has a higher priority in reconstruction. As such, a preset sorting manner for the attribute information that conforms with this principle can be used as the target sorting method. In this way, after the Data Manager obtains the attribute information for the to-be-reconstructed data, based on the attribute information for the plurality of to-be-reconstructed data, a reconstruction order for the plurality of to-be-reconstructed data is determined in the preset target sorting manner.

It should be noted that the target sorting manner can be set by the user based on actual conditions. For example, the attribute information may indicate whether there is a user-interested value. In this case, a target sorting manner may be: data with a user-interested value precedes data without a user-interested value.

It should be noted that, after determining the reconstruction order, the data reconstruction method provided in the embodiment of this application may further include:

reconstructing the plurality of to-be-reconstructed data items according to the reconstruction order.

Specifically, the Data Manager may send the reconstruction task of each of the to-be-reconstructed data items to a plurality of Encodes according to the reconstruction order, and the plurality of Encodes use EC technology to reconstruct the plurality of to-be-reconstructed data items according to the reconstruction order. The specific data reconstruction process will not be introduced here.

Of course, the reconstruction technology used in the embodiments of the present application is not limited to the EC technology.

In the solution provided by the embodiment of the present application, when data items need to be reconstructed, based on the pre-recorded attribute information for the plurality of to-be-reconstructed data, a reconstruction order for the plurality of to-be-reconstructed data is determined in a preset target sorting manner. A principle for reconstruction is that, in the target sorting manner, a data item of greater importance has a higher priority in reconstruction. This may reduce the probability that the important data cannot be recovered in case another failure occurs to the storage cluster. Recovery rate of important data is increased.

The above is an overview of a data reconstruction method provided by an embodiment of the present application. It is appreciated that in actual applications, the to-be-reconstructed data items in the embodiments of the present application may be video data items, voice data items, and so on. The data reconstruction method according to another embodiment of the present application is described below in an example where the to-be-reconstructed data items are video data items.

In order to facilitate the understanding of the solution, the process of obtaining and storing video data in the embodiment of this application is briefly described:

First, a recording plan is delivered to Access Service.

Secondly, Access Service obtains video data items from an IPC (IP Camera) and sends the obtained video data to Encode.

Third, Encode encodes the video data, and then sends the encoded video data to Storager Service.

Next, Storager Service stores the received encoded video data and reports the index information to Data Manager after a successful storage.

Then, Data Manage records the index information of the video data to its own database, and records and collect the playback information of the video data.

Specifically, the above steps are introduced in detail as follows:

(1) as for delivery of the recording plan to Access Service:

Specifically, the user may deliver the video recording plan, or the cloud storage system may automatically deliver the video recording plan. Both ways are reasonable.

(2) as for Access Service obtaining video data items from an IPC (IP Camera) and sending the obtained video data to Encode.

The video data refers to a video stream captured by the IPC.

Access Service is an access service module in the storage server, which is mainly responsible for executing the delivered recording plan, that is, obtaining video data items from the IPC. It is appreciated that, Access Service may obtain the video data of the IPC within a preset time period according to the requirements of the recording plan, and may also obtain the video data of the target IPC according to the requirements of the recording plan.

It should be noted that the cloud storage system may be associated with a plurality of IPCs. Each IPC shoots a video stream within its coverage, and analyzes the video stream to determine the data type of the video stream. The data types includes: a non-alarm type, an alarm type and an intelligent type. The IPC sends the video data to the Access Service. Of course, the IPC may also send the data type, the shooting time and the IPC address associated with the video data to Access Service.

The video data of the non-alarm type refers to video data shot by the IPC in real time. In other words, for video data of the non-alarm type, shooting conditions are not set. Then, when the shooting conditions are not set, the data type of the shot video data is determined by the IPC as a non-alarm type.

The video data of the alarm type is, however, captured under a set condition. That is, the corresponding IPC shoots the video when the condition is met. Then, when the shooting conditions are not set and the shooting conditions are met, the data type of the shot video data is determined by the IPC as the alarm type.

For example, an IPC covers an area where people are prohibited from entering. The corresponding shooting condition is that people enters the area. Then, when the IPC detects that people appear in the coverage, it will start to shoot video. Correspondingly, the data type of the video data is determined to be the alarm type. Alternatively, an IPC is monitoring a bank's ATM, and the corresponding shooting condition is that a person with a blocked face appears near the ATM. When the IPC detects that a person with a blocked face appears near the ATM, it will start to shoot video. Correspondingly, the data type of the video data is determined as the alarm type. It is appreciated that the video data of the alarm type indicates the alarm information corresponding to the shooting condition.

The video data of intelligent type includes, in addition to the video stream captured by the IPC, data about the characteristic information obtained by the IPC through image analysis of the video stream. Specifically, for example, the IPC analyzes a video stream, and obtains data about characteristic information such as the number of people, and the numbers of vehicles and colors in the video stream. This information may be used as the video data of the intelligent type.

It should be noted that the process of IPC analyzing the video stream to obtain data about characteristic information can be implemented using a variety of existing image analysis methods, such as neural network methods.

(3) as for the Encode encoding the video data, and then sending the encoded video data to the Storager Service:

The Encode is an encoding module in the storage server configured for performing video data encoding tasks. It should be noted that Encode can use any video encoding technology in the prior art to obtain encoded video data. The Encode encodes the video data, and then sends the encoded video data to the Storager Service.

(4) as for the Storager Service storing the received encoded video data, and reporting the index information to the Data Manager after a successful storage.

The Storager Service is the data storage service module in the storage server, and is mainly responsible for storing the received encoded video data items to a local disk and reporting the index information of each video data item to Data Manager. The index information includes the storage location of the video data item in the local disk. Of course, the index information may also includes the data type, the shooting time and the IPC address associated with the video data.

(5) as for the Data Manage recording the index information of the video data to its own database, and recording and counting the playback related information of the video data Specifically, the Data Manage records the storage location, the data type, the shooting time and the IPC address associated with the video data in the local disk to its own database.

It is appreciated that users can retrieve video data for playback based on the index information in the Data Manage. In this process, the Data Manage will record the relevant information of the video data played back by the user, and record the user's operation behavior on the video data, for example, record the playback time, the data type and the setting state, and count the playback frequency of video data. The playback frequency is the number of times the video data is played back within a preset time period. The set state includes a lock state and an unlock state.

Therefore, the attribute information corresponding to the video data is stored in the database of Data Manage. Among them, the attribute information includes attribute information corresponding to the video data storage stage, such as the storage time, the storage location, the IPC number, the IPC address, the shooting time, and the data type.

The attribute information further includes attribute information corresponding to the playback stage of the video data, such as the storage time, the storage location, the IPC number, the IPC address, the shooting time, the data type, the playback time, the playback frequency, the set state, and so on.

In the embodiment of the present application, the Data Manager may determine the reconstruction order for the plurality of to-be-reconstructed video data items based on the attribute information recorded in the video data storage stage and/or the video data playback stage in a preset target sorting manner.

Based on the foregoing process of obtaining and storing video data, the following takes the to-be-reconstructed data being the video data as an example to introduce the data reconstruction method provided in the embodiments of the present application. The attribute information used when reconstructing the video data may include: the data type.

Figure 2:
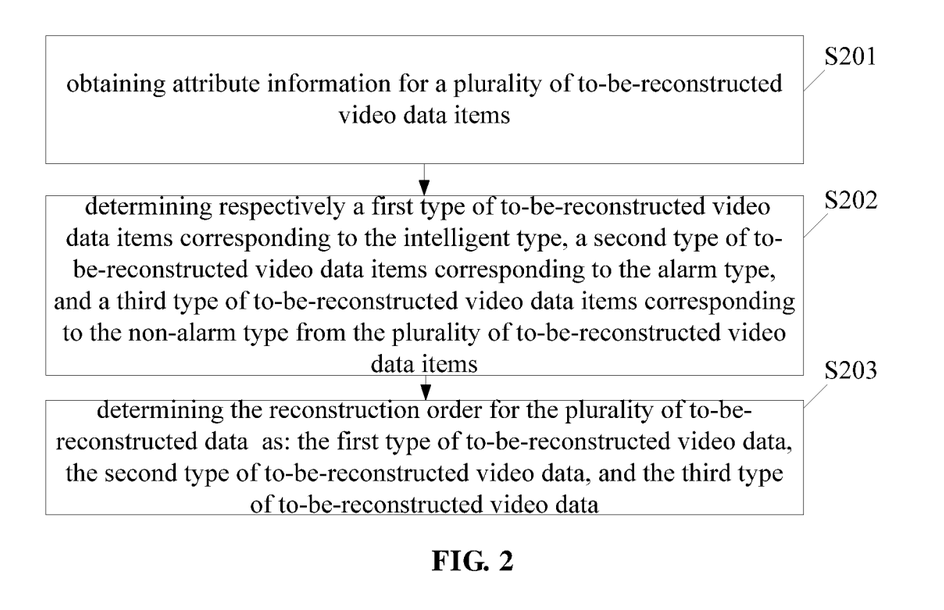
FIG. 2 is another schematic flowchart of a data reconstruction method provided by an embodiment of the application.

As shown in FIG. 2, a data reconstruction method provided by an embodiment of the application may include:

At S201, attribute information for a plurality of to-be-reconstructed video data items is obtained.

As mentioned before, the attribute information for any of the to-be-reconstructed video data items is a piece of information recorded before the to-be-reconstructed video data is lost.

In the embodiment of the present application, the attribute information includes a data type. The data type includes: a non-alarm type, an alarm type and an intelligent type.

In the embodiment of the present application, in the target sorting manner, the intelligent type precedes the alarm type, and the alarm type precedes the non-alarm type;

At S202, a first type of to-be-reconstructed video data items corresponding to the intelligent type, a second type of to-be-reconstructed video data items corresponding to the alarm type, and a third type of to-be-reconstructed video data items corresponding to the non-alarm type are determined respectively from the plurality of to-be-reconstructed video data items.

At S203, the reconstruction order for the plurality of to-be-reconstructed data is determined as: the first type of to-be-reconstructed video data, the second type of to-be-reconstructed video data, and the third type of to-be-reconstructed video data.

Optionally, the attribute information may also include the storage time. As such, in the target sorting manner, data items of the same type are sorted in terms of storage moments.

Correspondingly, the process of operation S203 may specifically include the following steps a1 and b1:

At step a1, the first type of to-be-reconstructed video data items, the second type of to-be-reconstructed video data items, and the third type of to-be-reconstructed video data items are sorted respectively according to storage moments of to-be-reconstructed video data items.

Specifically, the first type of to-be-reconstructed video data items, the second type of to-be-reconstructed video data items, and the third type of to-be-reconstructed video data items are sorted in an ascending order of storage moments. That is, a video data item stored earlier precedes a video data item stored later. Alternatively, the first type of to-be-reconstructed video data items, the second type of to-be-reconstructed video data items, and the third type of to-be-reconstructed video data items are sorted in a descending order of storage moments. That is, a video data item stored later precedes a video data item stored earlier.

At step b1, the reconstruction order for the plurality of to-be-reconstructed data items is determined as: the first type of to-be-reconstructed video data items as sorted, the second type of to-be-reconstructed video data items as sorted, and the third type of to-be-reconstructed video data items as sorted.

In the solution provided by the embodiment of the present application, when data items need to be reconstructed, based on the pre-recorded attribute information for the plurality of to-be-reconstructed data, a reconstruction order for the plurality of to-be-reconstructed data is determined in a preset target sorting manner. A principle for reconstruction is that, in the target sorting manner, a data item of greater importance has a higher priority in reconstruction. This may reduce the probability that the important data cannot be recovered in case another failure occurs to the storage cluster. Recovery rate of important data is increased.

Based on the foregoing process of obtaining and storing video data, the data reconstruction method according to another embodiment of the present application is described below in an example where the to-be-reconstructed data items are video data items. The attribute information for reconstructing the video data may include a playback frequency, a set state and a data type.

Figure 3:
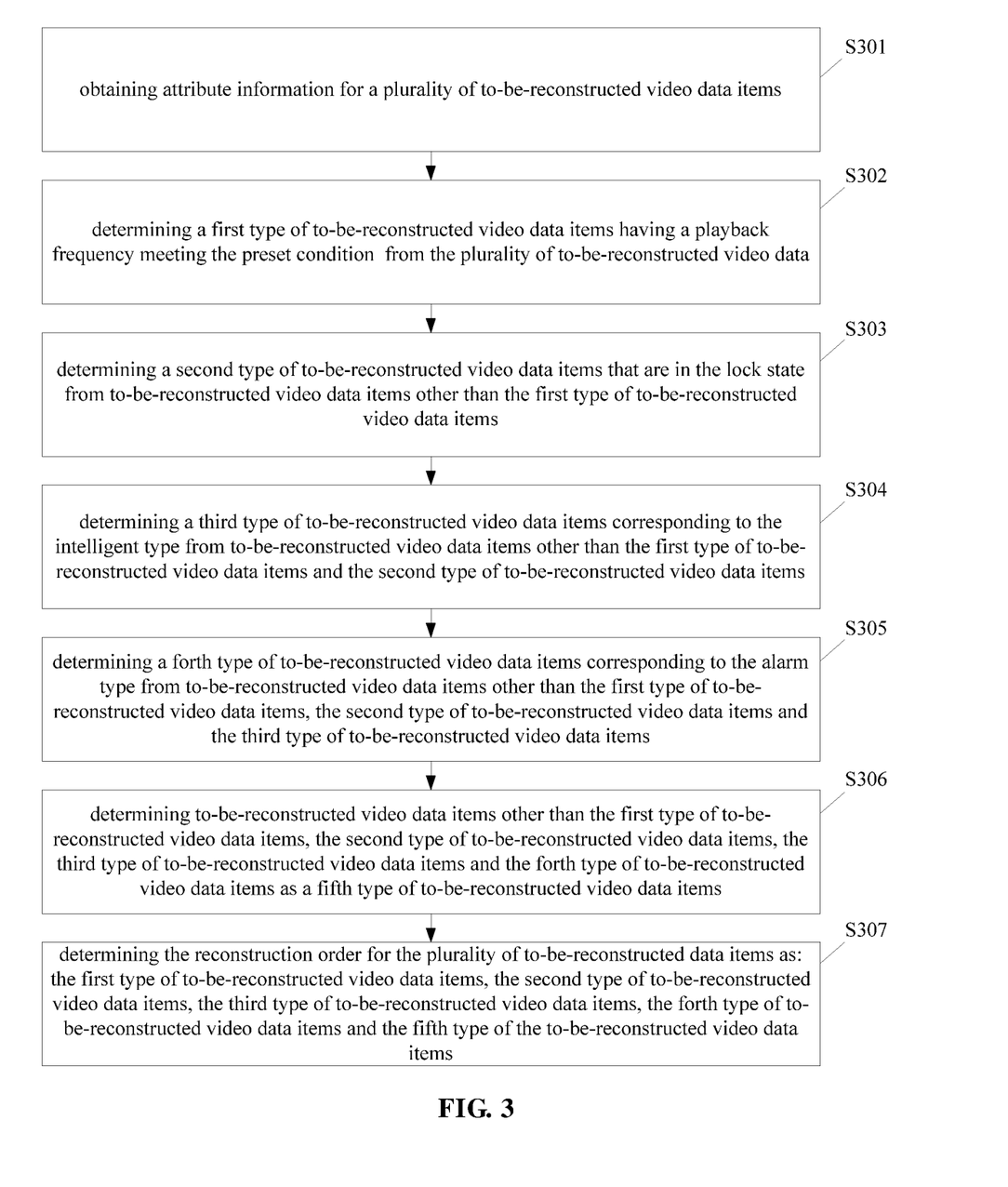
FIG. 3 is still another schematic flowchart of a data reconstruction method provided by an embodiment of the application.

As shown in FIG. 3, a data reconstruction method provided by an embodiment of the application may include the following operations.

At S301, obtaining attribute information for a plurality of to-be-reconstructed video data items is obtained.

As mentioned before, the attribute information of any of the to-be-reconstructed video data is a piece of information recorded before the to-be-reconstructed video data item is lost.

In the present embodiment, the attribute information includes a playback frequency, a set state and a data type. The data type includes a non-alarm type, an alarm type and an intelligent type. The set state includes a lock state and an unlock state.

In the target sorting manner, a first batch of data items are to-be-reconstructed video data items having a playback frequency meeting a preset condition, a second batch of data items are to-be-reconstructed video data items in the lock state, a third batch of data items are to-be-reconstructed video data items of the intelligent type, a forth batch of data items are to-be-reconstructed video data items of the alarm type, and a fifth batch of data items are to-be-reconstructed video data items other than the first batch of to-be-reconstructed video data items, the second batch of to-be-reconstructed video data items, the third batch of to-be-reconstructed video data items and the fourth batch of to-be-reconstructed video data items.

At S302, determining a first type of to-be-reconstructed video data items having a playback frequency meeting the preset condition from the plurality of to-be-reconstructed video data.

In the embodiment of the present application, the preset condition is met if the playback frequency of video data reaches a preset value, for example, the video is played more than 10 times a month.

At S303, determining a second type of to-be-reconstructed video data items that are in the lock state from to-be-reconstructed video data items other than the first type of to-be-reconstructed video data items.

At S304, determining a third type of to-be-reconstructed video data items corresponding to the intelligent type from to-be-reconstructed video data items other than the first type of to-be-reconstructed video data items and the second type of to-be-reconstructed video data items;

At S305, determining a forth type of to-be-reconstructed video data items corresponding to the alarm type from to-be-reconstructed video data items other than the first type of to-be-reconstructed video data items, the second type of to-be-reconstructed video data items and the third type of to-be-reconstructed video data items.

At S306, determining to-be-reconstructed video data items other than the first type of to-be-reconstructed video data items, the second type of to-be-reconstructed video data items, the third type of to-be-reconstructed video data items and the forth type of to-be-reconstructed video data items as a fifth type of to-be-reconstructed video data items.

At S307, determining the reconstruction order for the plurality of to-be-reconstructed data items as: the first type of to-be-reconstructed video data items, the second type of to-be-reconstructed video data items, the third type of to-bereconstructed video data items, the forth type of to-be-reconstructed video data items and the fifth type of the to-be-reconstructed video data items.

Optionally, in the embodiment of this application, the attribute information includes a storage moment. In this case, in the target sorting manner, data items of the same batch are sorted in terms of storage moments.

Accordingly, the process of step S307 may specifically include the following steps a2 and b2:

At step a2, sorting respectively the first type of to-be-reconstructed video data items, the second type of to-be-reconstructed video data items, the third type of to-be-reconstructed video data items, the forth type of to-be-reconstructed video data items and the fifth type of to-be-reconstructed video data items according to storage moments of to-be-reconstructed video data items.

Specifically, all of the to-be-reconstructed video data of the first type of the to-be-reconstructed video data, the second type of the to-be-reconstructed video data, the third type of the to-be-reconstructed video data, the forth type of the to-be-reconstructed video data and the fifth type of the to-be-reconstructed video data may be sorted in ascending order, based on that the video data with earlier storage time is sorted first. or, all of the to-be-reconstructed video data of the first type of the to-be-reconstructed video data, the second type of the to-be-reconstructed video data, the third type of the to-be-reconstructed video data, the forth type of the to-be-reconstructed video data and the fifth type of the to-be-reconstructed video data may be sorted in descending order, based on that the video data with earlier storage time is sorted later.

At step b2, determining the reconstruction order for the plurality of to-be-reconstructed data items as: the first type of to-be-reconstructed video data items as sorted, the second type of to-be-reconstructed video data items as sorted, the third type of to-be-reconstructed video data items as sorted, the forth type of to-be-reconstructed video data items as sorted and the fifth type of to-be-reconstructed video data items as sorted.

In the solution provided by the embodiment of the present application, when data items need to be reconstructed, based on the pre-recorded attribute information for the plurality of to-be-reconstructed data, a reconstruction order for the plurality of to-be-reconstructed data is determined in a preset target sorting manner. A principle for reconstruction is that, in the target sorting manner, a data item of greater importance has a higher priority in reconstruction. This may reduce the probability that the important data cannot be recovered in case another failure occurs to the storage cluster. Recovery rate of important data is increased.

Figure 4:
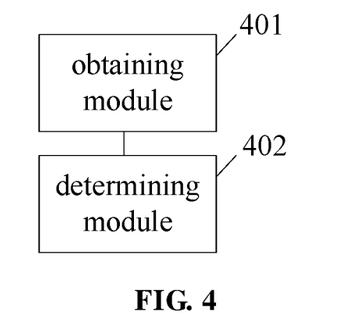
FIG. 4 is a schematic structural diagram of a data reconstruction apparatus provided by an embodiment of the application.

Corresponding to the foregoing method embodiment, the embodiment of the present application further provides a data reconstruction apparatus, which may be located in the Data Manage. As shown in FIG. 4, the data reconstruction apparatus includes:

an obtaining module 401 configured for obtaining attribute information for a plurality of to-be-reconstructed data items; wherein the attribute information of any of the to-be-reconstructed data items is information recorded before the to-be-reconstructed data item is lost; and a determining module 402 configured for determining, according to the attribute information for the plurality of to-be-reconstructed data items, a reconstruction order for the plurality of to-be-reconstructed data items in a preset target sorting manner. The target sorting manner relates to the attribute information, and in the target sorting manner, a data item of greater importance has a higher priority in reconstruction.

Optionally, in the embodiment of this application, the plurality of to-be-reconstructed data items includes a plurality of to-be-reconstructed video data items.

The attribute information includes a data type.

The data type includes: a non-alarm type, an alarm type and an intelligent type.

Optionally, in the embodiment of this application, in the target sorting manner, the intelligent type precedes the alarm type, and the alarm type precedes the non-alarm type.

The determining module 402 includes:

a first submodule configured for determining respectively, from the plurality of to-be-reconstructed video data items, a first type of to-be-reconstructed video data items corresponding to the intelligent type, a second type of to-be-reconstructed video data items corresponding to the alarm type, and a third type of to-be-reconstructed video data items corresponding to the non-alarm type; and a second submodule configured for determining the reconstruction order for the plurality of to-be-reconstructed data items as: the first type of to-be-reconstructed video data items, the second type of to-be-reconstructed video data items, and the third type of to-be-reconstructed video data items.

Optionally, in the embodiment of this application, the attribute information includes: a storage time.

In the target sorting manner, data items of the same type are sorted in terms of storage moments.

The second submodule is specifically configured for:

sorting respectively the first type of to-be-reconstructed video data items, the second type of to-be-reconstructed video data items, and the third type of to-be-reconstructed video data items according to storage moments of to-be-reconstructed video data items; and determining the reconstruction order for the plurality of to-be-reconstructed data items as: the first type of to-be-reconstructed video data items as sorted, the second type of to-be-reconstructed video data items as sorted, and the third type of to-be-reconstructed video data items as sorted.

Optionally, in the embodiment of this application, the attribute information further includes a playback frequency and a set state.

The set state includes a lock state and an unlock state.

Optionally, in the embodiment of this application, in the target sorting manner, a first batch of data items are to-be-reconstructed video data items having a playback frequency meeting a preset condition, a second batch of data items are to-be-reconstructed video data items in the lock state, a third batch of data items are to-be-reconstructed video data items of the intelligent type, a forth batch of data items are to-be-reconstructed video data items of the alarm type, and a fifth batch of data items are to-be-reconstructed video data items other than the first batch of to-be-reconstructed video data items, the second batch of to-be-reconstructed video data items, the third batch of to-be-reconstructed video data items and the fourth batch of to-be-reconstructed video data items.

The determining module 402 includes:

a first submodule configured for determining a first type of to-be-reconstructed video data items having a playback frequency meeting the preset condition from the plurality of to-be-reconstructed video data;

determining a second type of to-be-reconstructed video data items that are in the lock state from to-be-reconstructed video data items other than the first type of to-be-reconstructed video data items;

determining a third type of to-be-reconstructed video data items corresponding to the intelligent type from to-be-reconstructed video data items other than the first type of to-be-reconstructed video data items and the second type of to-be-reconstructed video data items;

determining a forth type of to-be-reconstructed video data items corresponding to the alarm type from to-be-reconstructed video data items other than the first type of to-be-reconstructed video data items, the second type of to-be-reconstructed video data items and the third type of to-be-reconstructed video data items; and determining to-be-reconstructed video data items other than the first type of to-be-reconstructed video data items, the second type of to-be-reconstructed video data items, the third type of to-be-reconstructed video data items and the forth type of to-be-reconstructed video data items as a fifth type of to-be-reconstructed video data items; and a second submodule configured for determining the reconstruction order for the plurality of to-be-reconstructed data items as: the first type of to-be-reconstructed video data items, the second type of to-be-reconstructed video data items, the third type of to-be-reconstructed video data items, the forth type of to-be-reconstructed video data items and the fifth type of the to-be-reconstructed video data items.

Optionally, in the embodiment of this application, the attribute information includes a storage moment.

In the target sorting manner, data items of the same batch are sorted in terms of storage moments.

The second submodule is specifically configured for:

sorting respectively the first type of to-be-reconstructed video data items, the second type of to-be-reconstructed video data items, the third type of to-be-reconstructed video data items, the forth type of to-be-reconstructed video data items and the fifth type of to-be-reconstructed video data items according to storage moments of to-be-reconstructed video data items; and determining the reconstruction order for the plurality of to-be-reconstructed data items as: the first type of to-be-reconstructed video data items as sorted, the second type of to-be-reconstructed video data items as sorted, the third type of to-be-reconstructed video data items as sorted, the forth type of to-be-reconstructed video data items as sorted and the fifth type of to-be-reconstructed video data items as sorted.

In the solution provided by the embodiment of the present application, when data items need to be reconstructed, based on the pre-recorded attribute information for the plurality of to-be-reconstructed data, a reconstruction order for the plurality of to-be-reconstructed data is determined in a preset target sorting manner. A principle for reconstruction is that, in the target sorting manner, a data item of greater importance has a higher priority in reconstruction. This may reduce the probability that the important data cannot be recovered in case another failure occurs to the storage cluster. Recovery rate of important data is increased.

Figure 5:
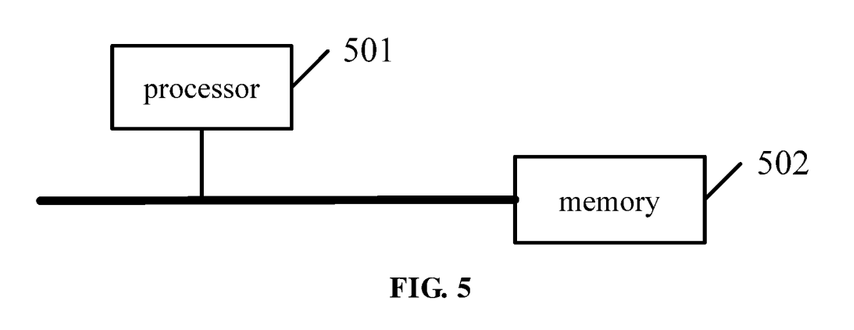
FIG. 5 is a schematic structural diagram of an electronic device provided by an embodiment of the present application.

Corresponding to the foregoing method embodiment, the embodiment of the present application provides an electronic device as shown in FIG. 5, including a processor 501 and a memory 502.

The memory 502 is configured for storing a computer program.

The processor 501 is configured for implementing the steps of data reconstruction method provided by the embodiment of the present application when executing the computer program stored in the memory 502.

The above-mentioned memory may include a Random Access Memory (RAM), and may also include a Non-Volatile Memory (NVM), such as at least one disk storage. Optionally, the memory may also be at least one storage device remote from the aforementioned processor.

The above processor may be a general-purpose processor, including a Central Processing Unit (CPU), or a Network Processor (NP); or may be a Digital Signal Processing (DSP) device, an Application Specific Integrated Circuit (ASIC), a field-programmable gate array (FPGA) or other programmable logic device, discrete gate or transistor logic device, discrete hardware component.

Through the above electronic device, when data items need to be reconstructed, based on pre-recorded attribute information for the plurality of to-be-reconstructed data, a reconstruction order for the plurality of to-be-reconstructed data is determined in a preset target sorting manner. A principle for reconstruction is that, in the target sorting manner, a data item of greater importance has a higher priority in reconstruction. This may reduce the probability that the important data cannot be recovered in case another failure occurs to the storage cluster. Recovery rate of important data is increased.

In addition, corresponding to the data reconstruction method provided in the above embodiment, the present application provides a computer-readable storage medium, having stored thereon a computer program which, upon execution by a processor, causes the processor to perform the operations in the data reconstruction method provided by the embodiment of the present application.

The above-mentioned computer-readable storage medium stores an application program that executes the data reconstruction method provided by the embodiment of the present application. As such, when data items need to be reconstructed, based on the pre-recorded attribute information for the plurality of to-be-reconstructed data, a reconstruction order for the plurality of to-be-reconstructed data is determined in a preset target sorting manner. A principle for reconstruction is that, in the target sorting manner, a data item of greater importance has a higher priority in reconstruction. This may reduce the probability that the important data cannot be recovered in case another failure occurs to the storage cluster. Recovery rate of important data is increased.

The electronic device embodiment and computer-readable storage medium embodiment are described in brief in view of resemblance to the foregoing method embodiment. Relevant parts can be known with reference to the description of the method embodiments.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "include," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements defined by the sentences "include(s) a . . . " or "include(s) a . . . " do not exclude that there are other identical elements in the processes, methods, articles, or devices which include these elements.

Each embodiment in this specification is described in a related manner, and the same or similar parts between the various embodiments can be referred to each other, and each embodiment focuses on the difference from other embodiments. In particular, as for the system embodiment, since it is basically similar to the method embodiment, the description is relatively simple, and for related parts, please refer to the part of the description of the method embodiment.

The above description is only the preferred embodiments of the present application and is not intended to limit the protection scope of the present application. Any amendments, equivalent substitutions, improvements etc. made within the spirit and principle of the present application are all included in the protection scope of the present application.

What is claimed is:

1. A data reconstruction method, which is performed by a data management module of a management server in a cloud storage system, the cloud storage system further comprising a plurality of storage servers which comprise a plurality of encoding modules, the method comprising:

obtaining from a database of the data management module, attribute information for a plurality of to-be-reconstructed video data items; wherein the attribute information of any of the to-be-reconstructed video data items is information recorded before the to-be-reconstructed data item is lost; wherein the attribute information comprises a data type, a playback frequency and a set state, and the data type comprises a non-alarm type, an alarm type and an intelligent type, and wherein the set state comprises a lock state and an unlock state, and determining, according to the attribute information for the plurality of to-be-reconstructed video data items, a reconstruction order for the plurality of to-be-reconstructed video data items in a preset target sorting manner;

sending reconstruction task of each of the to-be-reconstructed video data items to the plurality of encoding modules of the storage servers according to the reconstruction order, and using erasure code, EC, technology by the plurality of encoding modules to reconstruct the plurality of to-be-reconstructed video data items according to the reconstruction order;

wherein, the target sorting manner relates to the attribute information, and in the target sorting manner, a data item of greater importance has a higher priority in reconstruction, wherein, in the target sorting manner, a first batch of data items are to-be-reconstructed video data items having a playback frequency meeting a preset condition, a second batch of data items are to-be-reconstructed video data items in the lock state, a third batch of data items are to-be-reconstructed video data items of the intelligent type, a fourth batch of data items are to-be-reconstructed video data items of the alarm type, and a fifth batch of data items are to-be-reconstructed video data items other than the first batch of to-be-reconstructed video data items, the second batch of to-be-reconstructed video data items, the third batch of to-be-reconstructed video data items and the fourth batch of to-be-reconstructed video data items;

wherein, the to-be-reconstructed video data items of the lock state are video data that is prevented from being deleted by other users, the to-be-reconstructed video data items of the non-alarm type are video data shot by an IP Camera, IPC, in real time for which shooting conditions are not set, the to-be-reconstructed video data items of the alarm type are video data shot when shooting conditions are met, and the to-be-reconstructed video data items of intelligent type comprise video stream captured by the IPC and data about the characteristic information obtained by the IPC through image analysis of the video stream; and wherein, in the target sorting manner, the operation of determining, according to the attribute information for the plurality of to-be-reconstructed video data items, a reconstruction order for the plurality of to-be-reconstructed video data items in a preset target sorting manner comprises:

determining a first type of to-be-reconstructed video data items having a playback frequency meeting the preset condition from the plurality of to-be-reconstructed video data items;

determining a second type of to-be-reconstructed video data items that are in the lock state from to-be-reconstructed video data items other than the first type of to-be-reconstructed video data items;

determining a third type of to-be-reconstructed video data items corresponding to the intelligent type from to-be-reconstructed video data items other than the first type of to-be-reconstructed video data items and the second type of to-be-reconstructed video data items;

determining a fourth type of to-be-reconstructed video data items corresponding to the alarm type from to-be-reconstructed video data items other than the first type of to-be-reconstructed video data items, the second type of to-be-reconstructed video data items and the third type of to-be-reconstructed video data items;

determining to-be-reconstructed video data items other than the first type of to-be-reconstructed video data items, the second type of to-be-reconstructed video data items, the third type of to-be-reconstructed video data items and the fourth type of to-be-reconstructed video data items as a fifth type of to-be-reconstructed video data items; and determining the reconstruction order for the plurality of to-be-reconstructed video data items as: the first type of to-be-reconstructed video data items, the second type of to-be-reconstructed video data items, the third type of to-be-reconstructed video data items, the fourth type of to-be-reconstructed video data items and the fifth type of the to-be-reconstructed video data items.

2. The method according to claim 1, wherein, the attribute information further comprises a storage moment;

in the target sorting manner, data items of the same batch are sorted in terms of storage moments;

the operation of determining the reconstruction order for the plurality of to-be-reconstructed video data items as: the first type of to-be-reconstructed video data items, the second type of to-be-reconstructed video data items, the third type of to-be-reconstructed video data items, the fourth type of to-be-reconstructed video data items and the fifth type of the to-be-reconstructed video data items comprises:

sorting respectively the first type of to-be-reconstructed video data items, the second type of to-be-reconstructed video data items, the third type of to-be-reconstructed video data items, the fourth type of to-be-reconstructed video data items and the fifth type of to-be-reconstructed video data items according to storage moments of to-be-reconstructed video data items; and determining the reconstruction order for the plurality of to-be-reconstructed video data items as: the first type of to-be-reconstructed video data items as sorted, the second type of to-be-reconstructed video data items as sorted, the third type of to-be-reconstructed video data items as sorted, the fourth type of to-be-reconstructed video data items as sorted and the fifth type of to-be-reconstructed video data items as sorted.

3. An electronic device in a cloud storage system comprising a management server which comprises a data management module and a plurality of storage servers which comprise a plurality of encoding modules, comprising a processor and a memory, wherein:

the memory is configured for storing a computer program;

the processor is configured for executing the computer program stored in the memory to cause the processor to perform a data reconstruction method comprising:

obtaining from a database of the data management module, attribute information for a plurality of to-be-reconstructed video data items; wherein the attribute information of any of the to-be-reconstructed video data items is information recorded before the to-be-reconstructed data item is lost; wherein the attribute information comprises a data type, a playback frequency and a set state, and the data type comprises a non-alarm type, an alarm type and an intelligent type, and wherein the set state comprises a lock state and an unlock state, and determining, according to the attribute information for the plurality of to-be-reconstructed video data items, a reconstruction order for the plurality of to-be-reconstructed video data items in a preset target sorting manner;

sending reconstruction task of each of the to-be-reconstructed video data items to the plurality of encoding modules of the storage servers according to the reconstruction order, and using erasure code, EC, technology by the plurality of encoding modules to reconstruct the plurality of to-be-reconstructed video data items according to the reconstruction order;

wherein, the target sorting manner relates to the attribute information, and in the target sorting manner, a data item of greater importance has a higher priority in reconstruction, wherein, in the target sorting manner, a first batch of data items are to-be-reconstructed video data items having a playback frequency meeting a preset condition, a second batch of data items are to-be-reconstructed video data items in the lock state, a third batch of data items are to-be-reconstructed video data items of the intelligent type, a fourth batch of data items are to-be-reconstructed video data items of the alarm type, and a fifth batch of data items are to-be-reconstructed video data items other than the first batch of to-be-reconstructed video data items, the second batch of to-be-reconstructed video data items, the third batch of to-be-reconstructed video data items and the fourth batch of to-be-reconstructed video data items;

wherein, the to-be-reconstructed video data items of the lock state are video data that is prevented from being deleted by other users, the to-be-reconstructed video data items of the non-alarm type are video data shot by an IP Camera, IPC, in real time for which shooting conditions are not set, the to-be-reconstructed video data items of the alarm type are video data shot when shooting conditions are met, and the to-be-reconstructed video data items of intelligent type comprise video stream captured by the IPC and data about the characteristic information obtained by the IPC through image analysis of the video stream; and wherein, in the target sorting manner, the operation of determining, according to the attribute information for the plurality of to-be-reconstructed video data items, a reconstruction order for the plurality of to-be-reconstructed video data items in a preset target sorting manner comprises:

determining a first type of to-be-reconstructed video data items having a playback frequency meeting the preset condition from the plurality of to-be-reconstructed video data items;

determining a second type of to-be-reconstructed video data items that are in the lock state from to-be-reconstructed video data items other than the first type of to-be-reconstructed video data items;

determining a third type of to-be-reconstructed video data items corresponding to the intelligent type from to-be-reconstructed video data items other than the first type of to-be-reconstructed video data items and the second type of to-be-reconstructed video data items;

determining a fourth type of to-be-reconstructed video data items corresponding to the alarm type from to-be-reconstructed video data items other than the first type of to-be-reconstructed video data items, the second type of to-be-reconstructed video data items and the third type of to-be-reconstructed video data items;

determining to-be-reconstructed video data items other than the first type of to-be-reconstructed video data items, the second type of to-be-reconstructed video data items, the third type of to-be-reconstructed video data items and the fourth type of to-be-reconstructed video data items as a fifth type of to-be-reconstructed video data items; and determining the reconstruction order for the plurality of to-be-reconstructed video data items as: the first type of to-be-reconstructed video data items, the second type of to-be-reconstructed video data items, the third type of to-be-reconstructed video data items, the fourth type of to-be-reconstructed video data items and the fifth type of the to-be-reconstructed video data items.

4. The electronic device of claim 3, wherein, the attribute information further comprises a storage moment;

in the target sorting manner, data items of the same batch are sorted in terms of storage moments;

the operation of determining the reconstruction order for the plurality of to-be-reconstructed video data items as: the first type of to-be-reconstructed video data items, the second type of to-be-reconstructed video data items, the third type of to-be-reconstructed video data items, the fourth type of to-be-reconstructed video data items and the fifth type of the to-be-reconstructed video data items comprises:

sorting respectively the first type of to-be-reconstructed video data items, the second type of to-be-reconstructed video data items, the third type of to-be-reconstructed video data items, the fourth type of to-be-reconstructed video data items and the fifth type of to-be-reconstructed video data items according to storage moments of to-be-reconstructed video data items; and determining the reconstruction order for the plurality of to-be-reconstructed video data items as: the first type of to-be-reconstructed video data items as sorted, the second type of to-be-reconstructed video data items as sorted, the third type of to-be-reconstructed video data items as sorted, the fourth type of to-be-reconstructed video data items as sorted and the fifth type of to-be-reconstructed video data items as sorted.

5. A non-transitory computer-readable storage medium, having stored thereon a computer program that, upon executed by a processor, causes the processor to implement the method steps of claim 1.

\* \* \* \* \*